(No Model.)
H. R. WILLIAMS.
MEAT ROASTER.
No. 429,708. Patented June 10, 1890.
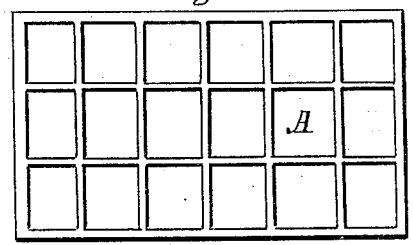
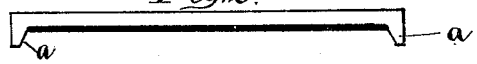
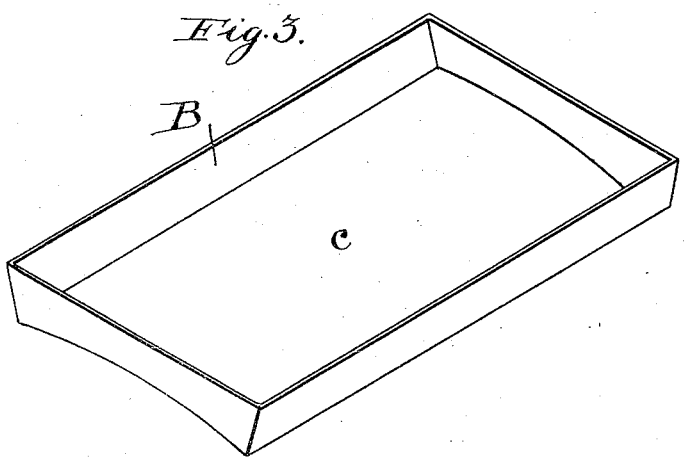
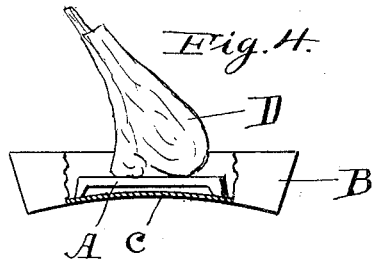
Witnesses:
S. W. Bates
G. M. Copenhaver
Inventor:
Henry R. Williams
By Robt. H. Head atty

UNITED STATES PATENT OFFICE.

HENRY R. WILLIAMS, OF OSHKOSH, WISCONSIN.

MEAT-ROASTER.

SPECIFICATION forming part of Letters Patent No. 429,708, dated June 10, 1890.

Application filed February 12, 1890. Serial No. 340,140. (No model.)

*To all whom it may concern:*

Be it known that I, HENRY R. WILLIAMS, a citizen of the United States, residing at the city of Oshkosh, in the county of Winnebago and State of Wisconsin, have invented certain new and useful Improvements in Meat-Roasters; and I do declare the following to be a full, clear, and exact description of the invention, such as will enable others skilled in the art to which it appertains to make and use the same, reference being had to the accompanying drawings, and to the letters of reference marked thereon, which form a part of this specification.

The objects of my invention are, first, to roast the meat equally from all sides and prevent it from being burned or boiled upon the bottom, and, second, to collect the drip or gravy and prevent it from becoming burned. I attain these objects by the construction shown in the accompanying drawings, in which—

Figure 1 is a plan view, and Fig. 2 a side view, of the grate; Fig. 3, a perspective view of the pan, and Fig. 4 an end view of the pan with a portion cut away to show position of the grate.

Similar letters refer to similar parts throughout the several views.

A is the grate, and *a a* are standards supporting the same at each corner.

B is the pan, the bottom of which *c c* is convex upon the inside and supports the grate upon which the meat D is placed, as shown in Fig. 4. The convexity of the bottom causes the drippings from the roast to flow to each side, where they can be readily dipped out with a ladle or spoon for basting purposes. Sufficient space is provided between the sides of the pan and the grate to admit the spoon for this purpose. The drip or gravy being at a considerable depth upon each side is less likely to burn than if spread out in a thin sheet over the whole bottom of the pan.

The grate A supports the roast D above the bottom of the pan, so that the bottom of the roast does not rest in the drippings and become boiled and soggy.

By means of my invention the hot air in the oven is allowed to reach all sides of the roast and causes it to become roasted equally as well upon the bottom as the top.

My improvement is simple and inexpensive. The grate can be readily removed for cleansing purposes.

Therefore what I claim as my invention, and desire to secure by Letters Patent, is—

A meat-roaster consisting of a grate to support the meat and a pan to receive the grate, said pan having its bottom convex on its inner surface, said grate being removable from the pan.

In testimony whereof I affix my signature in presence of two witnesses.

HENRY R. WILLIAMS.

Witnesses:
EARL P. FINCH,
FRED BEGLINGER.